United States Patent [19]
Sridhar et al.

[11] Patent Number: 5,007,047
[45] Date of Patent: Apr. 9, 1991

[54] ADAPTIVE RATE CONTROL FOR ECHO CANCELLING MODEM

[75] Inventors: Manickam R. Sridhar, Norton; John L. Payton, Dedham; Carol A. Bargoot, Bradford, all of Mass.

[73] Assignee: Codex Corporation, Mansfield, Mass.

[21] Appl. No.: 279,370

[22] Filed: Dec. 2, 1988

[51] Int. Cl.$^5$ .............................................. H04J 3/00
[52] U.S. Cl. ........................................ 370/32.1; 375/8; 379/406; 379/410
[58] Field of Search ................... 375/8, 93, 46, 56, 61, 375/113, 116, 111, 58; 358/412; 370/32.1, 32, 29; 379/406, 410

[56] References Cited

U.S. PATENT DOCUMENTS

| | | |
|---|---|---|
| Re. 31,253 | 5/1983 | Weinstein . |
| 3,449,716 | 6/1969 | Brothman et al. . |
| 3,534,264 | 10/1970 | Blasbalg et al. . |
| 3,536,840 | 10/1970 | Lee . |
| 4,110,558 | 8/1978 | Kageyama et al. . |
| 4,524,244 | 6/1985 | Faggin et al. . |
| 4,562,426 | 12/1985 | Forney, Jr. . |
| 4,589,111 | 5/1986 | Adachi . |
| 4,606,044 | 8/1986 | Kudo . |
| 4,630,126 | 12/1986 | Kaku et al. . |
| 4,653,044 | 3/1987 | Kudo ..................................... 370/29 |
| 4,736,388 | 4/1988 | Eguchi ................................... 375/58 |
| 4,756,007 | 7/1988 | Qureshi et al. . |
| 4,802,189 | 1/1989 | Wedler ................................... 375/37 |

FOREIGN PATENT DOCUMENTS

| | | |
|---|---|---|
| 0039191 | 4/1981 | European Pat. Off. . |
| 2188518 | 9/1987 | United Kingdom ................... 375/39 |

OTHER PUBLICATIONS

"Real Time Application of Trellis Coding to High-Speed Voiceband Data Transmission", H. Thapar, IEEE Journal in Selected Areas in Communications, vol. SAC-2 No. 5,9-1984, pp. 648 to 658.
"Microprocessor Implementation of High-Speed Data Modem," P Van Gerwen et al., IEEE Transactions on Communications, vol. Com-25, No. 2, 2-1977 pp. 238-258.
"Line Quality Monitoring Method", P. G. Bryant, IBM Technical Disclosure Bulletin, vol. 18, No. 8, Jan. 1976, p. 2726.
CCITT Draft Recommendation V.32.

*Primary Examiner*—Jin F. Ng
*Assistant Examiner*—Jhancy Augustus

[57] ABSTRACT

An echo cancellation modem for full-duplex communication over a channel with a remote device in accordance with one of several possible modulation schemes suitable for different channel qualities, respectively. The modem includes an echo canceller for reducing echo components appearing in the channel signal while leaving a residual echo component in the echo reduced channel signal, a monitor for determining the quality of the channel based on an analysis of the residual echo component, and a controller for selecting an acceptable modulation scheme, based on the analysis of the monitor. The modem selects the acceptable modulation scheme prior to data communication and it also requests changes to the appropriate level of modulation during data communication when the monitor indicates that the channel quality has changed significantly. The modem requests the remote device to operate at the selected rate and begins operating at the selected rate only if the remove device concurs. In another aspect, the modem includes a fall forward flag which is used to prevent contention between the modem and the remote device which would occur if the modem repeatedly requested an increase to a higher level modulation scheme which the remote device cannot support. In another aspect, the modem includes re-initialization logic which selects the appropriate thresholds used to monitor the quality of the channel depending upon whether the modulation option is coded or uncoded.

25 Claims, 8 Drawing Sheets

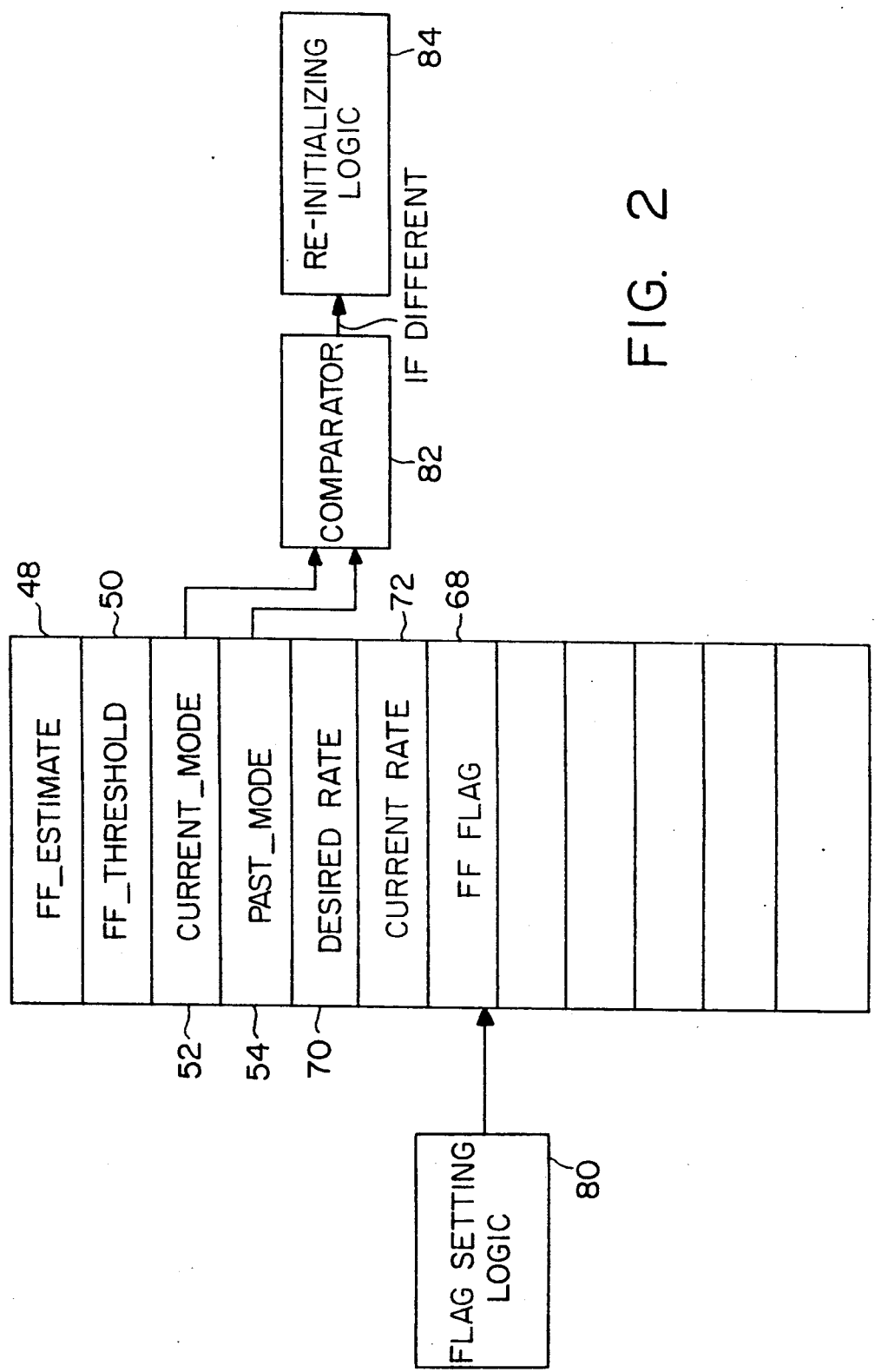

ADAPTIVE RATE CONTROL FOR ECHO CANCELLING MODEM

BACKGROUND OF THE INVENTION

This invention relates to modems.

A modem is a device for transmitting and receiving digital information over a bandwidth-limited channel, such as a telephone line. Typically, two modems are required to communicate over the channel in a given direction, one modem located at one end of the channel to transmit a signal and another modem at the other end of the channel to receive the signal. The transmitting modem employs an appropriate modulation technique to convert the digital signal into a form which may be transmitted over the channel and the receiving modem demodulates the received signal to recover the digital information.

Data transmission can occur in both directions over a channel and it can be in either half-duplex mode or fullduplex mode. In half-duplex mode, communication occurs only in one of the directions at any given time. In full-duplex mode, communication occurs in both directions at once. In both modes, the rate at which data can be transmitted depends critically on the quality of the channel, that is, on the amount and character of noise which the channel adds to the transmitted signal. Typical channel noise includes idle noise, which is present even when no signal is being transmitted, and signal induced distortion noise impairs the quality of the channel and reduces the signal-to-noise ratio of the transmitted signals. Thus, a higher noise level on the channel, or equivalently, lower channel quality, generally means that a lower communication rate must be used in order to achieve a reliable, error-free transfer of data.

In full-duplex mode, there is an additional impairment to channel quality besides channel noise. The additional impairment is referred to as echo. Some of the transmitted signal inevitably feeds directly back to the receiver side of the sending modem where it appears as an undesired near echo signal that interferes with the received signal sent by a remote modem. In addition, because impedance mismatches in the network are unavoidable, some of the sending modem's transmitted signal is reflected back from the distant modem and from any other point at which there is an impedance mismatch to the sending modem where it appears as a far echo signal which further corrupts the signal transmitted from the distant modem. The combination of the near and far echo are referred to as the combined echo.

Methods have been developed for separately dealing with the two types of channel impairment, namely, the channel distortion and the combined echo. For example, modems are available which have the ability to select the communication rate for half-duplex communication based upon the quality of the channel. Some of these modems determine the quality of the channel by measuring the amount of noise which is present in the received signal. Then, based upon a negotiation with the other modem with which they are communicating, these modems select from among several available communication rates the particular rate which will yield the desired signal-to-noise ratio, i.e., the desired performance given the noise present on the channel.

Modems are available which include an echo canceler to improve full-duplex communication. In principle, the echo canceler operates by generating replicas of the near and far echo signals which are then subtracted from the received signal to yield a relatively echo-free signal.

Modems which incorporate the above-described methods of dealing with channel impairments generally conform to specific communication protocols to assure that they can communicate with other modems which are made by other manufacturers and which may not incorporate the same methods of dealing with channel impairments. One important organization which develops such protocols is the CCITT group within the International Telecommunication Union (ITU). The CCITT has promulgated or recommended various protocols for half-duplex and full-duplex communication. For example, a current recommendation for the family of 2-wire, duplex modems is the V.32 specification. The V.32 specification defines the signaling sequences and timing of the sequences which two modems must use in order to establish and continue communications with each other. Since such standards are widely adopted by modem manufacturers, it is important that any features or capabilities which are developed for newer modems conform to such specifications.

SUMMARY OF THE INVENTION

In general, in one aspect, the invention features an echo cancellation modem for receiving data signals from a remote device over a channel in accordance with one of several possible modulation schemes suitable for different channel qualities, respectively, while simultaneously sending data signals to the remote device over the same channel; the modem includes an echo canceller for reducing echo components appearing in the channel signal while leaving a residual echo component in the echo reduced channel signal; a monitor for determining the quality of the channel based on an analysis of the residual echo component; and a controller for selecting an acceptable modulation scheme based on the analysis done by the monitor.

Preferred embodiments include the following features. The modem includes circuitry for equalizing and demodulating the echo reduced signal, and the monitor analyzes the residual echo component based on the equalized and demodulated echo reduced signal. There is also control circuitry for causing the monitor to analyze the residual echo component while the modem is transmitting a signal and the remote device is not sending a signal. The quality of the channel is determined based on a linear combination of the separate analyses of the channel distortion and the residual echo component. The controller includes means for requesting the remote device to shift to a higher level modulation scheme and means for shifting to the higher level modulation scheme if the remote device concurs. The controller also includes means for requesting the remote device to shift to a lower level modulation scheme and mean for the modem to unilaterally shift to the lower level modulation scheme for transmission of data signals to the remote device. The modulation schemes include different modulation rates, and coded and uncoded modulation modes. The controller further includes means for causing the modem to transmit data signals using the same modulation scheme as the remote device uses for its transmissions.

In general, in another aspect, the invention features a method for use in a modem of the kind which receives data signals from a remote device over a channel in accordance with one of a range of available modulation schemes suitable, respectively, for a range of different channel qualities, a higher level modulation scheme being suitable for a higher channel quality, the method includes determining whether the current channel quality would support a higher level modulation scheme than the current modulation scheme; if so, sending a request the remote device to use a desired higher level modulation scheme; and conditioning the modem not to later request a higher level modulation scheme if a higher level modulation scheme cannot be supported.

Preferred embodiments include the following features. The conditioning is based upon the modulation scheme chosen by the other device in response to the request sent from the modem. If the remote device concurs in the use of the desired modulation scheme and if there remains a higher level modulation scheme usable by the modem, then the modem is conditioned to later request a higher level modulation scheme if the channel quality later improves; if the remote device does not concur in the use of the desired modulation scheme or if there is not higher level modulation scheme usable by the modem, then the modem is conditioned to refrain from alter requesting a higher level modulation scheme if the channel quality later improves.

In general, in another aspect, the invention features monitoring the quality of the channel based on received data signals, determining when a change to a higher level modulation scheme would be permissible based on when the monitored channel quality exceeds a threshold, and setting the threshold to one value with respect to a change to a coded modulation mode, and to a different value with respect to a change to an uncoded modulation mode.

Preferred embodiments of the invention include the following features. The modem is initialized using one threshold corresponding to one of the modulation modes, and reinitialized using the other threshold in response to a request from the remote device to switch to the other mode.

In general, in another aspect, the invention features monitoring the quality of the channel, with an echo present, and selecting a signal point constellation for modulation based on the monitored channel quality.

In preferred embodiments, one signal point constellation comprises more than $2^N$ points, where N is the number of bits per signaling interval to be sent.

In general, in another aspect, the invention features a method for setting an initial reception rate for a echo cancellation modem of the kind which receives data signals from a remote device at one of several possible rates and which is subject to an initial training procedure prior to initial reception of data signals; the method includes monitoring the quality of the channel during the initial training procedure, and immediately setting the initial rate to a value corresponding to the rate sustainable on the channel based on its monitored quality.

The invention allows a modem to select as well as adjust the rate at which the modem communicates in full-duplex operation over the channel with the remove device based upon a measure of the overall channel quality which includes a measure residual echo as well as the channel distortions. In addition, since the channel quality determination in the preferred embodiment is made using the received signal after it has been processed by equalizer-demodulator, the modem more accurately estimates the impact of the combined channel impairments on the signal points which are used to decide what the actual transmitted signal points were. Moreover, the ability of the modem to separately measure the impairments due to residual echo and channel distortion gives the modem the capability of selecting the optimum communication rate during the start-up sequence defined by the CCITT V.32 specification.

In addition, the invention provides a mechanism for avoiding contention between the modem and the remote device. In other words, neither the modem nor the remote device will repeatedly request a fall forward to a higher modulation scheme when the other modem either does not concur with the request when first sent or is incapable of operating at a higher modulation scheme. By preventing repeated unproductive retrains, data communication is not needlessly interrupted.

The invention offers the additional advantage of making it possible to utilize a wider range of modulation schemes for data communication. That is, even though the thresholds for determining when a fall forward to higher modulation depend upon whether the modulation is uncoded or coded, the invention provides a mechanism for assuring that fall forward decisions are made using the appropriate thresholds.

Other advantages and features will become apparent from the following description of the preferred embodiment, and from the claims.

DESCRIPTION OF THE PREFERRED EMBODIMENT

We first briefly describe the drawings.

Figure 1:
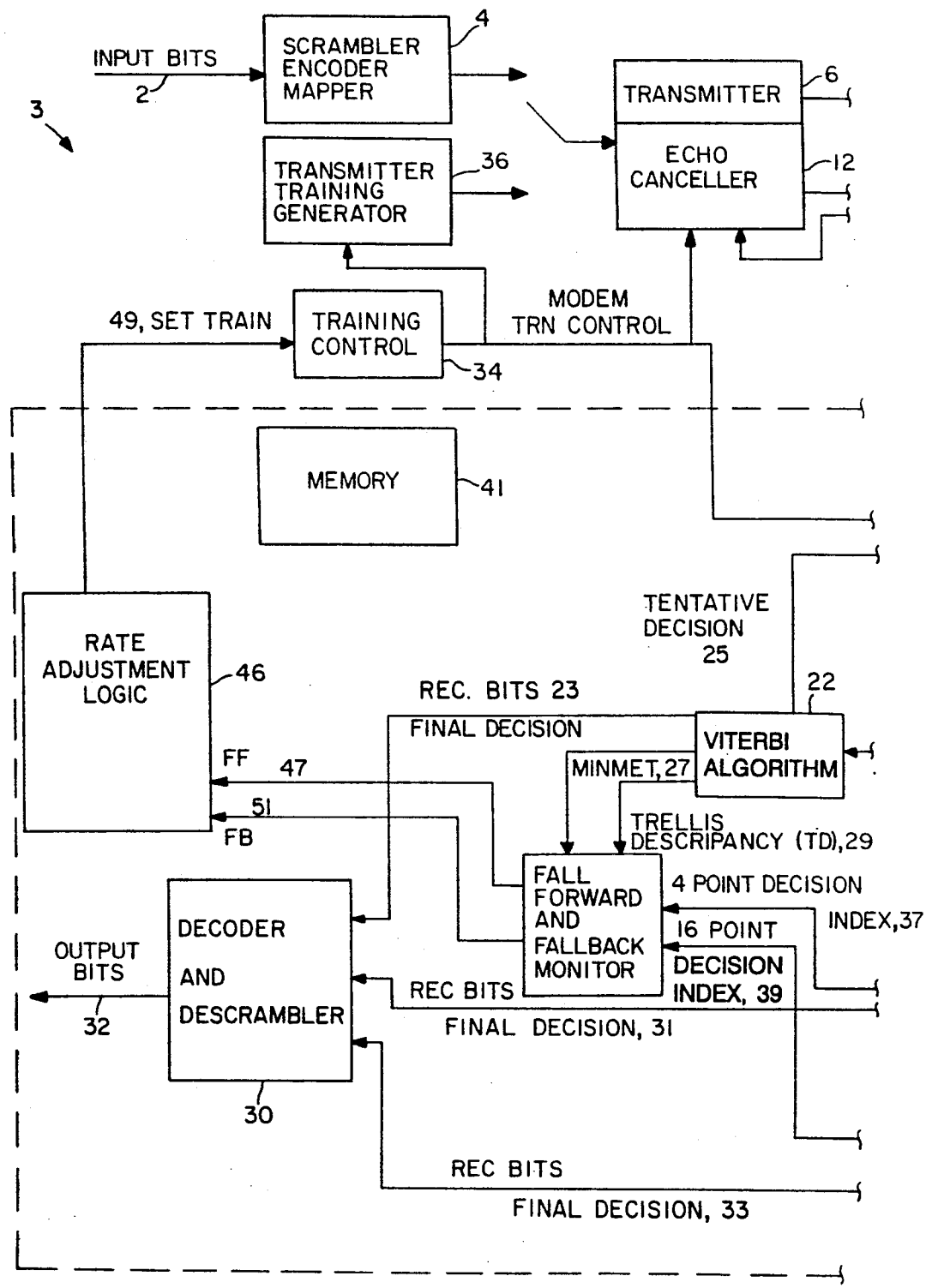
FIG. 1 is a functional block diagram of an echo cancelling modem which embodies the invention.
Figures 1, 4:
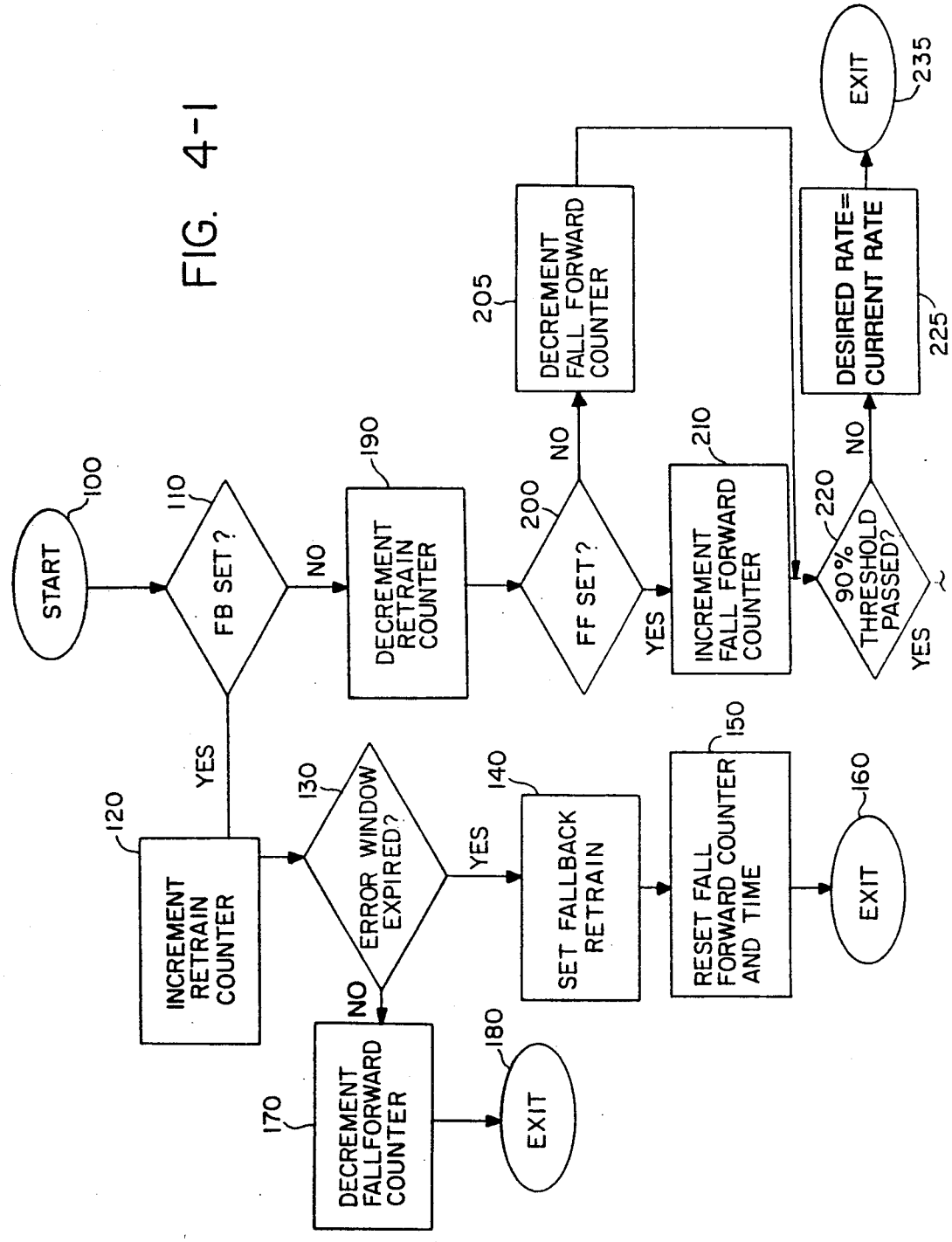
Figures 2, 4:
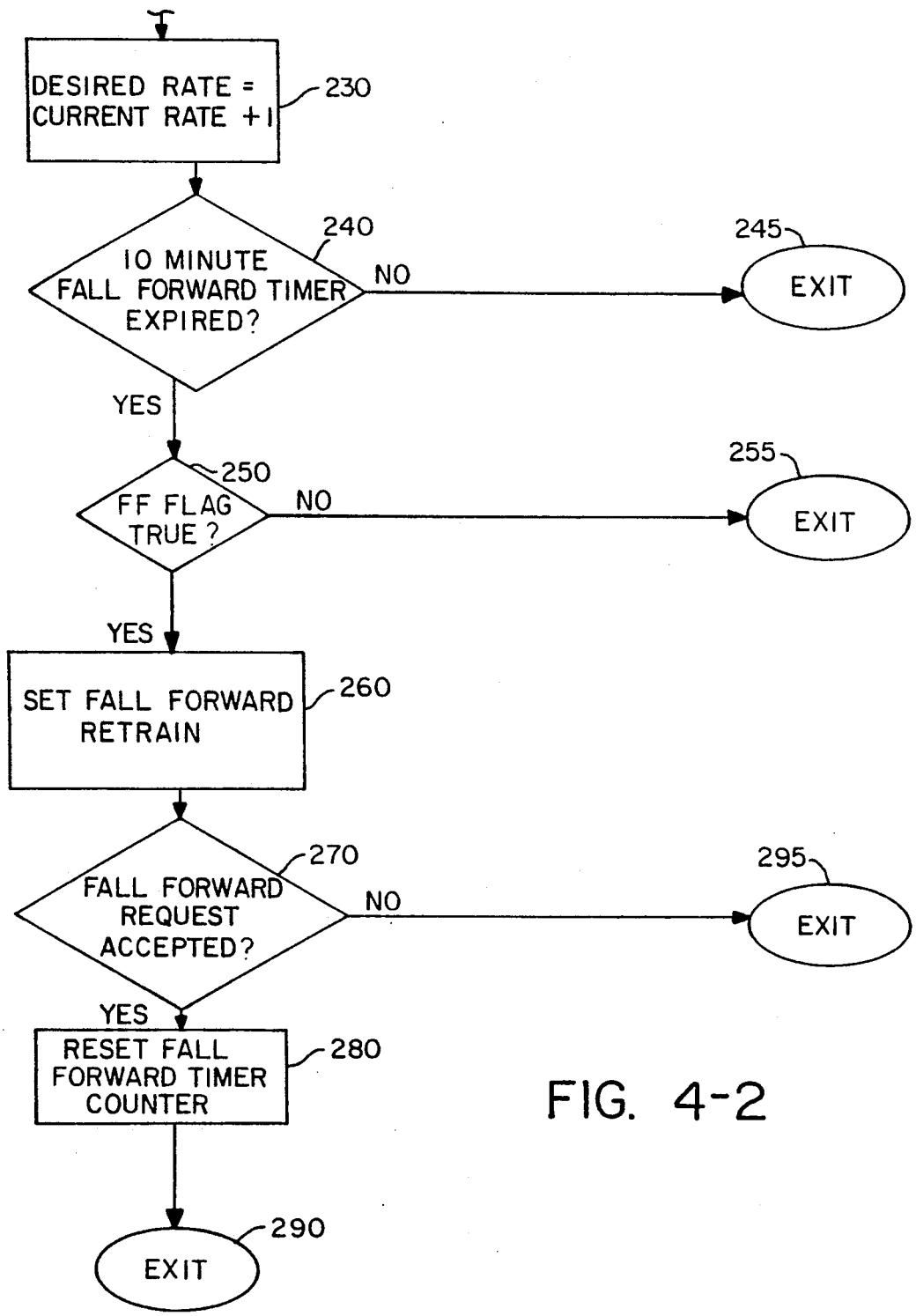
Figure 5:
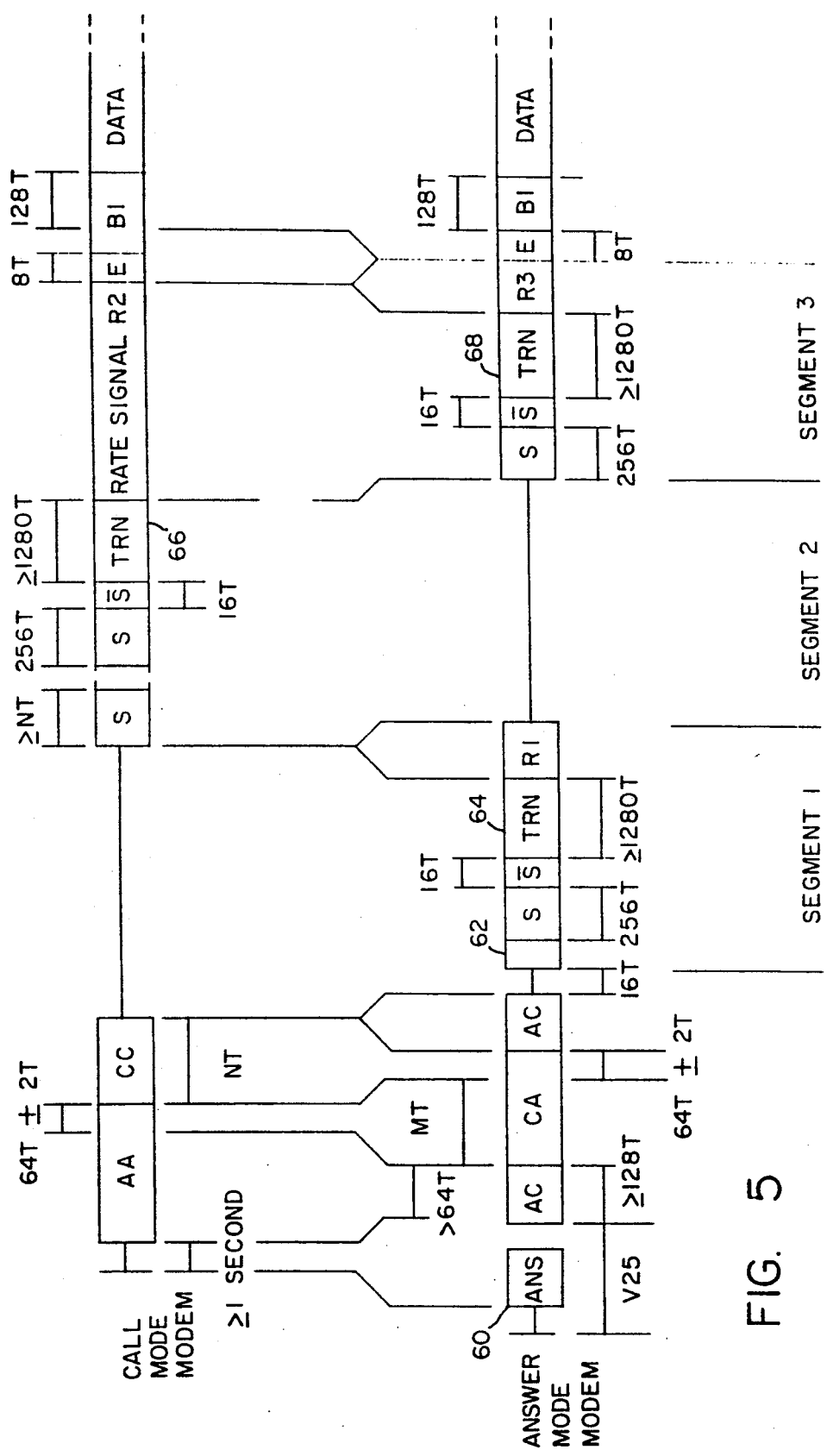

FIGS. 3a–d depict "leaky" integrators included in the fall-forward and fall-back monitor shown in FIG. 1;

FIG. 4 is a flow chart of the operation of the rate adjustment logic shown in FIG. 1;

FIG. 5 is a signal timing diagram of the CCITT V.32 specification; and.

Figure 6:
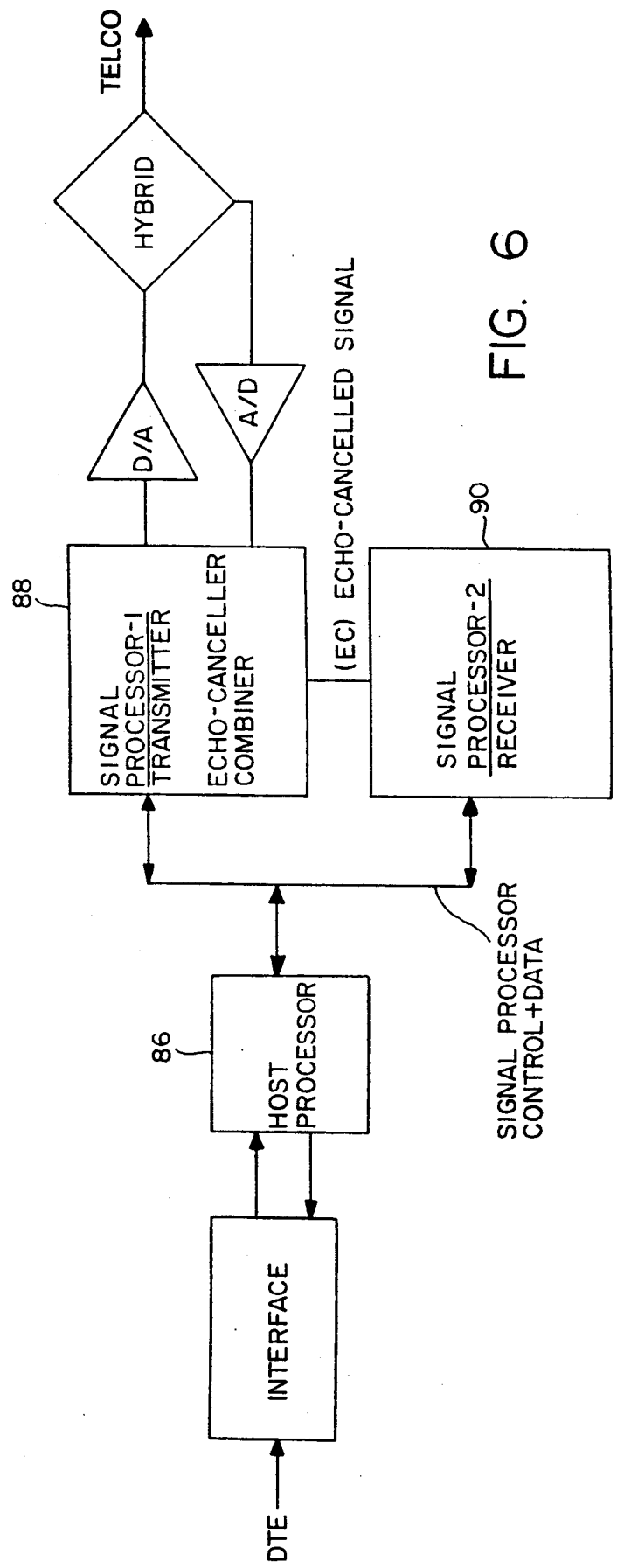

FIG. 6 is a high level block diagram of a modem which embodies the invention.

STRUCTURE AND OPERATION

Referring to FIG. 1, in a two-wire, full-duplex echo cancelling modem 3 having an adaptive rate system, an input line 2 receives a data bit stream from a DTE (digital terminal equipment), not shown. A scrambler-encoder-mapper 4 processes the data bit stream by (a) randomizing the bits so that no bit pattern is more likely to occur than any other pattern, (b) encoding groups of bits into symbols according to the particular code being used, and (c) mapping the symbols onto a signal constellation being used. The output of the scrambler-encoder-mapper is a complex signal (in FIG. 1 complex signals are depicted by thicker lines) which goes to a transmitter 6 where it is filtered and used to modulate a carrier to produce a real analog transmit signal 7 which may be transmitted over a signal channel 8, such as a telephone line, to a remote modem (not shown). Before being transmitted over the channel 8, the transmit signal passes through a hybrid circuit 10.

Hybrid circuit 10 is the modem's interface to the channel 8 and serves to separate transmitted signals, which are sent out over the channel, and received signals, which have been sent to modem 3 from a remote modem over the same channel. Ideally, the hybrid 10 directs all of the transmit signal onto channel 8 and diverts only the arriving received signal to a receiver 16 within the modem. In reality, some of the transmit signal feeds through the hybrid 10 onto the path of the received signal where it appears as a near echo which combines with the received signal from the remote modem to produce a received signal (REC) 13. The REC 13 may also include a far echo.

To eliminate the near and far echos from REC 13, the modem also includes an adaptive echo canceller 12 and a combiner 14. Typically, the adaptive elements of echo canceller 12 are trained, using a least-mean-squares (LMS) algorithm, during an initial training sequence, prior to data communication, so that the echo canceller 12 generates an estimated echo signal 15 which closely approximates the combined echo signal present in REC 13. The combiner 14 essentially subtracts the estimated echo signal 15 from REC 13 to produce an echo-cancelled signal (EC) 17. The combiner 14 also generates an error signal (representing the error between the actual combined echo and the estimated echo signal 15) which the echo canceller 12 uses to continually learn about the characteristics of the channel so that it can improve the accuracy of the estimated echo signal.

The EC signal 17 goes to the receiver 16 where it is processed to generate an output data stream of bits 32 representing the bit stream sent to the modem 3 by the remote modem. The receiver 16 includes an adaptive equalizer-demodulator 18 which transforms EC 17 to a complex received signal (CREC) 19 representing, on a signaling interval by signaling interval basis, the successive signals comprising EC 17. Any corrections to the adaptive elements of the equalizer-demodulator 18 are handled by the control box 20.

CREC 19 at the output of the equalizer-demodulator 18 is processed in one of three ways, depending upon the communication rate and depending upon the mode of the signal, i.e., whether the signal was produced by coded or uncoded modulation.

If the signal is coded, a Viterbi algorithm decoder 22 computes, after a delay, a final decision 23 for each received signal. The operation of the Viterbi decoder 22 is explained generally in Forney, "The Viterbi Algorithm", Proceedings of the IEEE, Vol. 61, No. 3, Mar. 1973, and as applied to modem operations in U.S. Pat. No. 4,562,426 entitled Symbol Coding Apparatus, to Forney, incorporated herein by reference. The Viterbi algorithm decoder 22 also sends a tentative decision 25 to the equalizer-demodulator initialization and update control 20, and it sends a minimum metric (MINMET 27) and a trellis discrepancy (TD 29) to a fall-forward and fall-back monitor 24 ("the FF/FB monitor").

Uncoded signals are processed differently. If the received signal has been communicated using a 4800 bit/sec rate, then 4-phase decision logic 26 makes a hard decision using a 4-point signal constellation to arrive at decision 31 for each received signal point. And, if the signal is communicated using a 9600 bit/sec rate, then 16-point decision logic 28 makes a hard decision on a 16-point signal constellation to arrive at decision 33 for each received signal point. In all three cases, the decisions 23, 31 and 33 (in the form of bits) are sent to decoder and descrambler 30 which produces the output data stream 32.

The 4-phase decision logic 26 and the 16-point decision logic 28 also generate a 4-point decision index 37 and a 16-point decision index 39, respectively, which are used by the FF/FB monitor 24. These aspects of the 4-phase decision logic 26 and the 16-point decision logic 28 are explained more fully below.

Figures 1, 2:
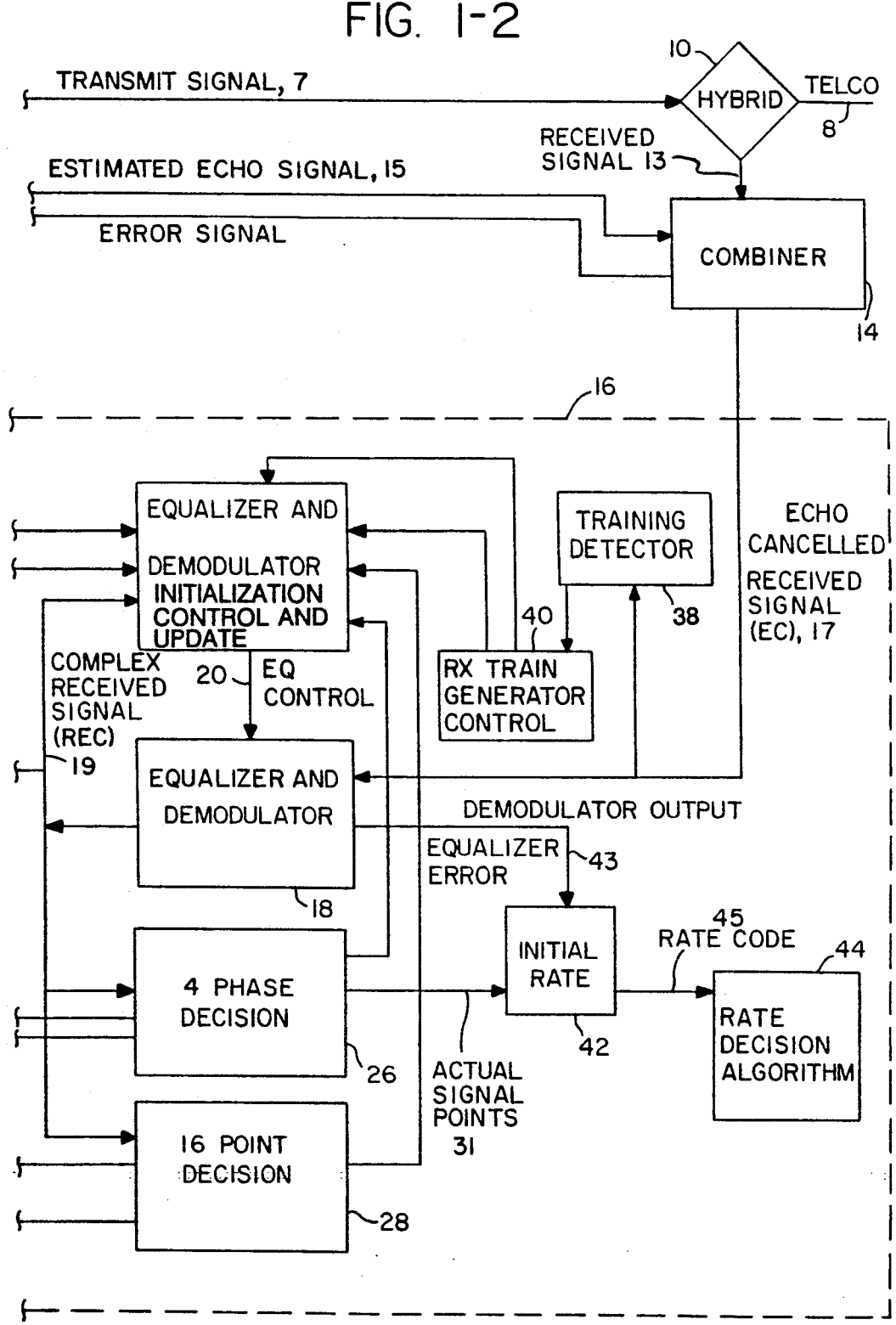
FIG. 2 is a block diagram of memory registers in the modem of FIG 1.

The receiver 16 also includes memory 41 which stores the variables that are used by the various components in the receiver during operation. Some of the registers within the memory 41 are shown in FIG. 2. The relevance of particular registers will be explained below in connection with the receiver subsystem which utilizes the register.

Initial training and all retraining of the modem is controlled by a training control 34 and a transmitter training generator 36. When training or retraining occurs, the training generator 36 sends a predetermined signal sequence, as specified by the applicable communication protocol, to the transmitter 6 for transmission over the channel 8 to the remote modem. To respond to training sequences sent by the remote modem, the modem also includes a training detector 38 which monitors EC 17 to detect the presence of a training sequence in the signal from the remote modem. If the training detector 38 detects a training sequence, it causes an RX train generator control 40 to coordinate the operation of the modem during the period of training and to synchronize the transmitter 6, the receiver 16, and the echo-canceller 12.

During the initial training period, which occurs soon after the modem has made contact with a remote modem, initial rate logic 42 determines the combined impairment of the channel, including the residual echo (defined as the echo which remains after the combiner 14 has cancelled most of the echo). Inputs to the initial rate logic 42 for this determination are provided by the 4-phase decision logic 26 and the equalizer-demodulator 18. The equalizer-demodulator 18 generates the complex received signals on line 43 and the 4-phase decision logic 26, which is programmed to "know" the points in the signal constellation used for training, generates the actual signal points which were sent. The initial rate logic 42 computes the squared distance between each received signal point and the corresponding actual signal point. The initial rate logic 42 then averages the computed squared distance over many received signal points to arrive at an estimate of the impairment to the channel 8. Finally, based upon the estimated channel impairment, the initial rate logic 42 computes a rate code 45, which reflects the combined impairment of the channel.

The initial rate logic 42 uses two different methods to determine the combined channel impairment, depending upon whether the modem is using half-duplex training or full-duplex training. The significance of this distinction will become more apparent later. If the modem is using half-duplex training, the initial rate logic 42 separately determines an estimate of the channel distortion and an estimate of the residual echo. Then, the initial rate logic 42 combines these two estimates to arrive at an estimate of the combined impairment of the channel. If, on the other hand, the modem is using full-duplex training, the initial rate logic 42 directly determines the estimate of the combined impairment of the channel, which includes the residual echo, without first arriving at separate estimates for the channel distortion and the residual echo.

To appreciate the differences in the modem's operation during full-duplex and half-duplex training, it is helpful to refer to communication between a local modem, which initiates data communication over a channel, and a remote modem, which responds to the local modem. When half-duplex training occurs in each direction in preparation for full-duplex data communication, the training generally has at least two periods during which half-duplex training occurs. For example, in one period, the remote modem transmits a training signal while the local modem remains silent. In the other period, the local modem transmits a training signal while the remote modem remains silent. The initial rate logic 42 uses each of these periods of the training to determine a different component of the combined impairment to the channel.

When the remote modem is transmitting the training signal and the local modem is silent, the local modem is not producing an echo signal. Thus, its receiver simply receives the signal transmitted by the remote modem, which includes the channel impairments attributable to idle noise and signal induced distortion The equalizer-demodulator 18 uses the received signal to train its adaptive elements and also converts the received signal into CREC 19. Assuming that the half-duplex training is using a 4800 bit/sec signal, CREC 19 comprises signal points that are clustered about the four points in the signal constellation being used. The 4-phase decision logic 26 converts the received signals to the actual signal points by making a hard decision on the four point constellation. Then, the initial rate logic 42 measures the dispersion of the received signals around the actual signal points. It does this by calculating the squared distance of the received signals from the actual signal points. The initial rate logic 42 averages the squared distance measurements over many signal intervals to produce the following quantity: $N\_HD$, which is a measure of the distortion when the local modem is receiving a half-duplex training signal sent by the remote modem. That is, $N\_HD$ is a measure of the channel impairments, excluding the echo.

During the other period of half-duplex training, when the local modem is transmitting the training signal and the remote modem is silent, the local modem receives an echo signal plus the idle noise of the channel. Assuming that the echo canceller 12 is first trained, using the appropriate training sequence, the combiner 14 then generates EC 17. The equalizer-demodulator 18, which was trained during the previous period of half-duplex training and has frozen its adaptive elements, converts this to the CREC 19. Since the remote modem is not transmitting a signal, the received signals are clustered about the origin. The relevant parameters of the 4-phase decision logic 26 are changed during this phase of operation so that the 4-phase logic 26 generates the actual signal points by folding the received signals into the origin. The initial rate logic 42 then measures the dispersion of the received signals about the origin. Again, this is accomplished by measuring the squared distance between the received signals and the origin. The initial rate logic 42 then averages the squared distance measurements over many signal intervals to produce the following quantity: $SQRERR_{echo}$, which is a measure of the noise signal received by the local modem when it is transmitting a half-duplex training signal. That is, $SQRERR_{echo}$ is a measure of the echo signal plus the idle noise on the channel.

After the initial rate logic 42 has obtained measurements of the channel distortion and of the echo, it combines these two measurements in the following way to obtain an estimate of the combined impairment of the channel 8.

$$SQRERR_{echo} + \beta * N\_HD$$

where $\beta$ is a scaling constant used to eliminate the contribution of the idle noise.

The scaling factor is necessary because idle noise is included in both measurements $SQRERR_{echo}$ and $N\_HD$. A simple sum of the two measurements would yield a result which underestimates the quality of the channel 8. In one particular embodiment, $\beta$ is selected to be $\frac{1}{2}$, which reflects an assumption that each component of noise on the channel, namely, echo, idle noise, and signal induced distortion, contain approximately equal energy. This proves to yield good modem performance.

As noted earlier, when the local modem is using full-duplex training, the local modem can determine directly the combined impairment of the channel without computing separate components of it. During the full-duplex training, the local modem receives both a transmitted signal from a remote modem and the echo signal caused by its transmitted signal to the remote modem. Consequently, EC 17 reflects the combined impairment of the channel, including signal induced distortion, idle noise and echo. CREC 19 produced by the equalizer-demodulator 18 comprises received signals which are clustered about the actual signal points, i.e., the four signal points of the signal constellation. As before the initial rate logic 42 determines the dispersion. In other words, it measures the squared distance between the received signals and the actual signal points and averages this measurement over many signal intervals. The resulting quantity is $SQRERR_{combined}$, which is a measure of the noise signal received by the local modem during full-duplex operation. That is, $SQRERR_{combined}$ is a measure of the combined impairment of the channel including idle noise, signal induced distortion, and echo.

In both the half-duplex and the full-duplex methods, the initial rate logic 42 converts the resulting measure of combined impairment to a rate code 45. It does this by using the following transformations:

$$Rate\ code = QUAN\{SQRERR_{echo} + \beta * N\_HD\}$$

$$Rate\ code = QUAN\{SQRERR_{combined}\}$$

QUAN is a quantization function which sets the thresholds for selecting different signal constellations.

Rate code 45 generated by the QUAN function is passed to a rate decision algorithm 44 which uses it to select the signal constellation for data communication over the channel. In effect, the rate decision logic 44 in combination with the QUAN function determines the particular signal constellation from among the signal constellations available to the modem which will yield optimum performance. That is, they select the signal constellation which will yield the highest data transmission speed while still providing the desired signal-to-noise ratio in view of the combined impairment of the channel. The QUAN maps the measurement of the combined impairment of the channel onto the rate code index and the rate decision logic 44 uses the index to identify the signal constellation In one embodiment, the QUAN function generates an even number which is from 0 to 8. The numbers designate the following:

8—any signal constellation for a signal to noise ratio which is less than the 16 point 9600 uncoded constellation, including the 32 point 9600 coded constellation;

6—any signal constellation for a signal to noise ratio which is less than the 32 point 9600 coded constellation;

4—any signal constellation for a signal to noise ratio which is less than the 4 point 4800 uncoded constellation;

2—any signal constellation for a signal to noise ratio which is less than the 2 point 2400 uncoded constellation; and 0—disconnect.

After the initial communication rate has been selected and data communication has begun, the FF/FB monitor 24 assumes responsibility for monitoring the quality of the channel during data communication. As noted earlier, to monitor the quality of the channel the FF/FB monitor 24 relies upon input from the Viterbi algorithm 22, the 4-phase decision logic 26, or the 16-point decision logic 28, depending, of course, on the data communication rate being used at the time and upon whether the signal is coded or uncoded. If the overall channel quality has improved or deteriorated significantly, the FF/FB monitor 24 asserts a fall-forward (FF) indicator 47 or a fall-back (FB) indicator 51, respectively. A rate adjustment logic 46 monitors the FF indicators 47 and the FB indicators 51 and determines when a retrain at a different rate is desirable. Thus, the FF/FB monitor 24 and the rate adjustment logic 46 work together to adaptively adjust the communication rate requested by the modem in response to changes in the quality of the channel. When the rate adjustment logic 46 determines that a retrain should occur, it sends a set train signal 49 (SET TRAIN) to the training control 34 thereby initiating a retrain.

When the received signal is coded, the FF/FB monitor 24 relies on the minimum metrics (MINMET 27) and the trellis discrepancies (TD 29) provided by the Viterbi algorithm 22 to monitor channel quality. In essence, the minimum metric 27 is a cumulative history of how accurately the tentative decisions 25 generated by the Viterbi algorithm 22 have estimated the received signals. Thus, the minimum metric 27 is a good indicator of the overall accuracy of the receiver 16. The trellis discrepancy 29, on the other hand, is a measure of the accuracy of individual tentative decisions. Thus, the trellis discrepancy 29 is a good indicator of the occurrence of errors.

In one embodiment, an 8-state code which is specified in the V.32 recommendation is used. Using that code, the Viterbi algorithm 22 computes the minimum metric 27 for each received signal by first determining the metrics for all of the signal points of the signal constellation. The metric for a signal point in the constellation is equal to the minimum squared distance between that point and the received signal. Then, the algorithm 22 computes a path metric for each of the eight states in the state progression diagram ("the trellis) for the modulation code. The path metric for a state is the sum of the metrics along a path through the trellis which terminates at that state. Each of the eight states has only four paths leading to that state from within the trellis, one of which has a lower path metric than the other three. For each state, the algorithm 22 selects the path with the lowest path metric, which is the most likely path to that state. Finally, the algorithm 22 selects the minimum metric 27 from among the surviving paths. The minimum metric path identified during a given symbol interval, that is, the time between the transmission of each successive signal, permits a final decision to be made regarding the received signal several symbol intervals earlier, e.g. 16 symbol intervals for the eight state code. The minimum metric 27 reflects the probability of error relating to the path and thus indicates the quality of the path.

The Viterbi algorithm 22 further computes the trellis discrepancy 29 by comparing the tentative decision regarding the received signal to the final decision arrived at several symbol intervals later. If the decisions are the same, indicating that the tentative decision was correct, the trellis discrepancy 29 is 0; whereas, if the decisions are not the same, indicating that the tentative desicion was incorrect, the trellis discrepancy 29 is 1.

After each new signal is received, the algorithm 22 updates the metrics and the path metrics for each of the eight states and provides a new minimum metric 27 and a new trellis discrepancy 29 to the FF/FB monitor 24 for the corresponding tentative decision 25 which was made several symbol intervals earlier.

Figure 3A:
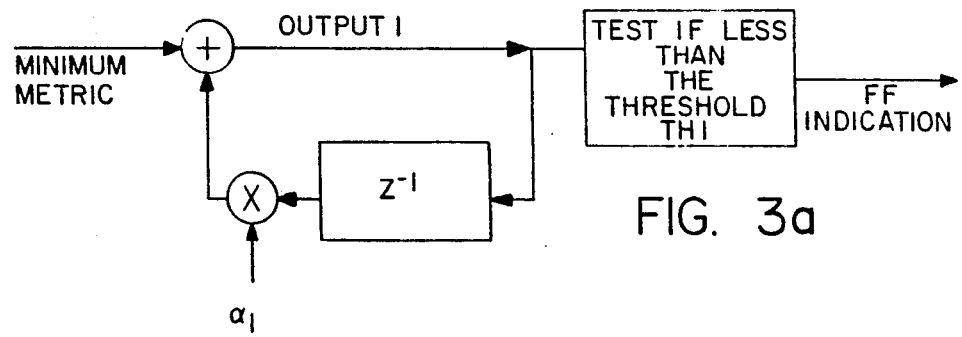
Figure 3B:
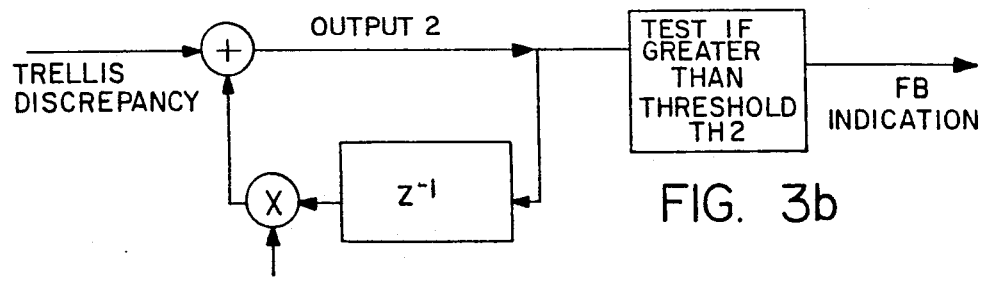

The FF/FB monitor 24 employs two different "leaky" integrators to separately integrate the sequences of trellis discrepancies and minimum metrics which it receives from the Viterbi algorithm 22. Functional representations of the "leaky" integrators for the minimum metric and trellis discrepancy sequences are illustrated in FIGS. 3a and 3b, respectively. In general, the "leaky" integrator produces an output which is equal to the value of the relevant variable for the current symbol interval plus "$\alpha$" times the output from the previous symbol interval, where "$\alpha$" is less than one. In the case of the sequence of minimum metrics 27, the FF/FB monitor 24 compares the output of the "leaky" integrator (shown in FIG. 3a) during each symbol interval to a threshold TH1. If the output falls below the threshold TH1, the FF/FB monitor 24 asserts the FF indicator 47, indicating that the quality of the channel 8 has improved. Otherwise, it does not assert the FF indicator 47. In the case of the sequence of trelles discrepancies, the FF/FB monitor 24 compares the output of the "leaky" integrator (shown in FIG. 3b) during each symbol interval to a threshold TH2. If the output rises above the threshold TH2, the FF/FB monitor 24 asserts the FB indicator 51, indicating that the quality of the channel 8 has deteriorated. Otherwise, it does not assert the FB indicator 51.

The thresholds TH1 and TH2 and the time constants for the "leaky" integrators, which are equal to $(1-\alpha)^{-1}$, are selected to achieve the modem performance which is desired. The modem examines the FF and FB indicators 47 and 51 during a window of time and does not request any changes in the communication rate until the window has expired. The duration of this window affects the magnitude of the time constants which are appropriate. If the duration of the window is selected to be about ten minutes, then time constants which fall within the range of 100 to 250 milliseconds produce good modem performance.

Figure 3C:
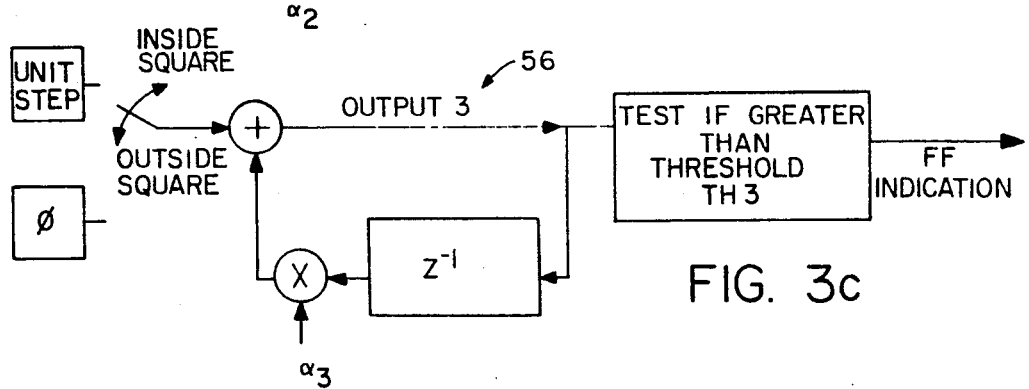
Figure 3D:
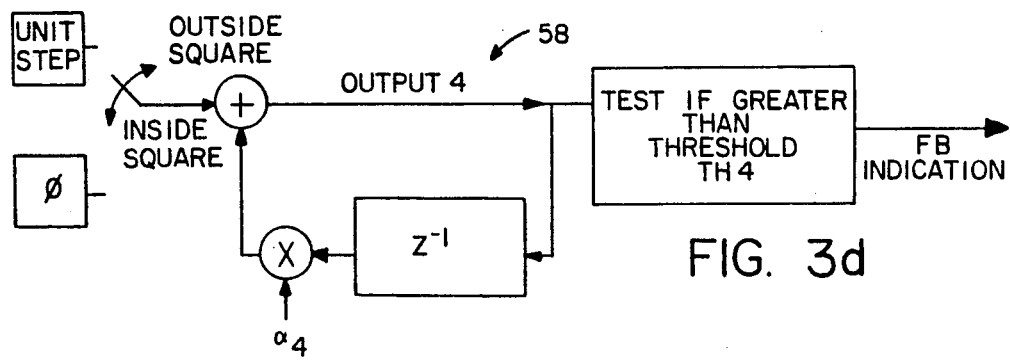

When the received signal is uncoded, the FF/FB monitor 24 relies on the decision indexes 37 generated by the 4-phase decision logic 26 or the decision indexes 39 generated by 16-point decision logic 28, depending upon the communication rate. The FF/FB monitor 24 uses a first "leaky" integrator 56 and a second "leaky" integrator 58 to monitor the decision indexes The first integrator 56 and the second integrator 58 are illustrated in FIGS. 3c and 3d, respectively.

For signals sent at 4800 bits/sec, the 4-phase decision logic 26 produces the 4-point decision index for each received signal based upon how far the signal in CREC 19 is from its corresponding signal point in the signal constellation. In effect, the 4-phase decision logic 26 places two concentric squares, namely, an inner square and an outer square, around each point in the signal constellation. If the received signal falls within an inner square, the 4-phase decision logic 26 sends a unit step signal to the first integrator 56 in the FF/FB monitor 24 and a null signal to the second integrator 58 in the FF/FB monitor 24. However, if the received signal falls outside of the outer square, the 4-phase decision logic 26 sends a unit step signal to the second integrator 58 and a null signal to the first integrator 56. Of course, if the signal falls between the inner and the outer squares, then null signals are sent to both the first integrator 56 and the second integrator 58.

The 16-point decision logic 28 operates in a way which is similar the way the 4-phase decision logic 26 operates. That is, each point in the 16-point signal constellation is surrounded by an inner square and an outer square and the 16-point decision logic 28 determines where the received signal falls with respect to the two sets of squares. Like the 4-point decision logic 26, if the received signal falls within an inner square, the 16-point decision logic 28 sends a unit step signal to the first integrator and a null signal to the second integrator 58. If the received signal falls outside of the outer squares, the 16-point decision logic 28 sends a unit step to the second integrator 58 and a null signal to the first integrator 56. A received signal falling between the inner and outer square means that both integrators receive null signals.

The first and second integrators 56 and 58 each produce outputs which are tested against corresponding thresholds. If the output of the first integrator 56 rises above a threshold TH3, then the FF/FB monitor 24 asserts the FF indicator 47; otherwise it does not. And if the output of the second integrator 58 rises above a threshold TH4, then the FF/FB monitor 24 asserts the FB indicator 51; otherwise it does not.

As with the other integrators in the FF/FB monitor 24, the thresholds TH3 and TH4 and the time constants for the first and second integrators 56 and 58 are selected to achieve the modem performance which is desired.

The function of the rate adjustment logic 46 which acts on the FF and FB indicators 47 and 51 will now be described. FIG. 4 shows the steps of the algorithm which the rate adjustment logic 46 executes. After a signal is received, the rate adjustment logic 46 begins execution of the steps of the algorithm (step 100). First, the logic 46 tests if the FB indicator 51 is asserted (step 110). If the FB indicator 51 is asserted, a retrain counter is incremented (step 120) and an error window is checked (step 130). The retrain counter records the occurrences of poor channel quality. The error window is a sliding window which is generated by the logic 46 and which monitors the retrain counter to detect when two 2-second periods of continuous FB indication occur during a ten second interval. When such a sequence of poor channel quality has been detected, the logic 46 terminates the error window. If the check of the error window indicates that it has expired, then the logic 46 sends a set fall-back retrain signal to the training control 34 (step 140), thereby initiating a complete retrain of local modem. During the ensuing retrain all of the adaptive elements in both modems are reset and a new communication rate is selected based upon the indication that the current rate could not sustained. The rate initial rate logic 42 determines a new communication rate, which is generally lower than the previous communication rate. The new communication rate may not be lower if the cause of the retrain was a temporary drop in the quality of the channel which no longer exists by the time that the initial rate logic 42 measures the channel quality.

After the set fall-back retrain is sent, the rate adjustment logic 46 also resets both a fall-forward counter and a fall-forward timer to zero (step !50) and then exits the algorithm (step 160) so that it is ready to respond to the next received signal. As will be described in more detail shortly, the fall-forward counter and the fall forward timer are used to evaluate how good the channel quality is. Therefore, whenever a fall-back retrain is requested, it is appropriate that their contents be reinitialized to zero, as is done.

If it is determined in step 130 that the error window has not expired, the rate adjustment logic 46 decrements a fall-forward counter (step 170) and exits the algorithm (step 180).

Back in step 110 if the FB indicator 51 was not asserted, then the rate adjustment logic 46 decrements the retrain counter (step 190). Since the logic 46 relies on the retrain counter as an indication of how bad the channel quality is, it is appropriate that the retrain counter reflect instances when acceptable signal quality is detected.

Next, the rate adjustment logic 46 determines whether the FF indicator 47 is asserted (step 200). If it is set, the logic 46 increments the fall-forward counter (step 210) and checks to see if the FF indicator 47 has been asserted for at least 90% of a ten minute window (step 220). In this step, the contents of two registers, namely, a FF.ESTIMATE register 48 and a FF.THRESHOLD register 50, shown in FIG. 2, are compared. The FF.ESTIMATE register 48 is a counter which records how many received signals during the ten minute interval resulted in asserting the FF indicator 47 and the FF.THRESHOLD register 50 contains a number which corresponds to the 90% threshold test. The 90% threshold test is the criterion used to determine whether the quality of the channel has improved sufficiently to support an increase in the communication rate.

In step 200 if the FF indicator 47 is not asserted, the rate adjustment logic 46 decrements the fall-forward counter and branches to step 220 where the 90% threshold test is conducted (step 20).

If it passes the 90% threshold test, then the logic 46 sets a DESIRED RATE variable, which is stored in a DESIRED RATE register 70, equal to a communication rate which is one level higher than the current communication rate (step 220). The current communication rate is stored as a CURRENT RATE variable in a CURRENT RATE register 72 shown in FIG. 2. After that, the logic 46 looks at the fall forward timer to determine if the ten minute window has expired (step 240). If the ten minute window has expired, then the logic 46 determines the condition of a fall-forward (FF) flag which is stored in a fall-forward (FF) flag register 68 shown in FIG. 2 (step 250). If the ten minute has not expired, the logic 46 exits from the algorithm (step 245).

If the 90% threshold test is not passed in step 220, the rate adjustment logic 46 sets the DESIRED RAT variable equal to the CURRENT RATE variable (step 225) and then exits (step 235).

The FF flag provides a mechanism for resolving rate setting contention between the local modem and the remote modem, as will be described below. If the FF flag is true, the logic 46 sets a fall-forward retrain (step 260) and waits to see if the fall-forward request is accepted by the remote modem. Otherwise, the logic 46 exits from the algorithm (step 255).

The fall-forward retrain causes the training control 34 to signal the remote modem that an increase in rate is desired. During the fall-forward retrain, the adaptive elements in both modems are kept as they were before the retrain and the modems merely use the retrain to request a higher communication rate, which is specified by the DESIRED RATE variable stored in the DESIRED RATE register 70.

Finally, if the fall-forward request is accepted (step 270), the rate adjustment logic 46 resets the fall-forward counter and the fall-forward timer for the next ten minute period (step 280). Then, the rate adjustment logic 46 exits the algorithm so that it is prepared to respond to the next signal point (step 290). If the fall-forward request is not accepted, the logic 46 exits from the algorithm (step 275).

In summary, a modem which implements the rate adjustment algorithm described above, operates according to the following rules. If within any ten second period the modem detects two periods of poor signal quality, each lasting at least two seconds, then the modem will force a fall-back retrain to occur. During the fall-back retrain both modems completely retrain their adaptive elements and select a new, generally lower, communication rate which accommodates the deterioration in channel quality which forced the retrain. On the other hand, if the modem detects a sustained period of good signal quality, it will indicate by a fall-forward retrain that an increase in the communication rate is desired. A retrain in which the rate is increased occurs only if both modems can sustain the increase and during that retrain the adaptive elements of neither modem are changed. The modem determines when a sustained period of good signal quality has occurred by monitoring the FF indicator 47 during windows having a ten minute duration. If the FF indicator 47 has been asserted for at least 90% of the ten minute interval (and if the FF flag is true), the modem will request a rate increase.

As noted above, the FF flag prevents wasteful contention between the local modem and the remote modem. Wasteful contention occurs when one modem continues to ask for an increase to a rate higher than is supported by the other modem. It also occurs when one modem continues to experience improved channel quality while the other modem does not. In either case, a request for a higher rate would not result in a higher rate being selected. Thus, repeated retrains used to communicate the request for the higher rate would unnecessarily disrupt data communication.

To avoid the unnecessary disruption, each modem has a register which stores a corresponding FF flag. In the local modem, here designated the CALL modem, the FF flag is set by flag setting logic 80 shown in FIG. 2. The flag setting logic 80 sets the FF forward flag in accordance with the following rule. If the highest common rate available in the CALL modem and the ANSWER modem is greater than the DESIRED RATE the DESIRED RATE is equal to the CURRENT RATE, then the FF flag in the CALL modem is true; otherwise it is false. In the remote modem, which shall be referred to as the ANSWER modem, the FF flag is set in accordance with a different rule. If the CURRENT RATE is less than the DESIRED RATE indicated by the CALL modem, then the FF flag in the ANSWER modem is true otherwise it is false.

The way in which the FF flags avoid contention can be more easily appreciated by looking at an example. At the conclusion of the start-up or initial training sequence which precedes data communication, the ANSWER modem arrives at a communication rate, referred to as the CURRENT RATE, which is based upon its measurement of channel quality, the CALL modem's measurement of channel quality, and the communication rates available to the ANSWER modem. If the CURRENT RATE is less than the maximum available rate in the CALL modem and it is also equal to the DESIRED RATE requested by the CALL modem, then the FF flag in the CALL modem will be set to true. As described in connection with step 240 in FIG. 4, this means that the CALL modem will be permitted to request a fall-forward retrain under the appropriate signal conditions. That is, if the CALL modem experiences a period of improved signal quality which meets the test for a fall-forward, it will be permitted to increase the DESIRED RATE to a higher level and then request a fall-forward retrain during which the new DESIRED RATE will be communicated to the ANSWER modem.

Notice, however, that once the new DESIRED RATE is set and communicated to the ANSWER modem and the ANSWER nodem does not increase its communication rate to the new DESIRED LEVEL, the test for the FF flag is no longer satisfied. Now, the DESIRED RATE no longer equals the CURRENT RATE. Therefore, the CALL modem must also set its FF flag to false. This means that even though the CALL modem may continue to experience improved signal quality, it may not continue to request the higher rate through repeated fallforward retrains. Indeed, as long as the FF flag in the CALL modem remains false, fall-forward retrain requests will be prohibited.

In the ANSWER modem the scenario is slightly different. At the conclusion of the start-up sequence and under the assumptions stated above, the CURRENT RATE is equal to the initial DESIRED RATE requested by the CALL modem. Therefore, the FF flag in the ANSWER modem is set to false. As long as its FF flag remains false, the ANSWER modem may not request a fall-forward retrain even though it may experience a period of improved signal quality. However, after the CALL modem sends a retrain requesting a new DESIRED RATE which is higher than the CURRENT RATE and if the ANSWER modem still responds with a lower communication rate, the ANSWER modem must set its FF flag to true. Then, when the ANSWER modem experiences improved signal quality, it may initiate a fall-forward retrain which increases the communication rate to a higher level.

After the communication rate has been increased in response to improved signal quality, then each modem recomputes the corresponding FF flag based upon the above-described rules. Then, the process described above may occur again. Both modems can set the FF flag to false if the communication rate is the highest rate sustainable by either modem. Only one modem can set its FF flag to be true at any given time. In this way, the FF flags of both modems prevent either modem from requesting a fall-forward in communication rate after the other modem has provided evidence that it cannot support such an increase in rate.

The communication protocol between modems is defined by the CCITT V.32 specification. A timing diagram illustrating a start-up or initial training sequence as defined in the V.32 specification for the CALL modem and the ANSWER modem is depicted in FIG. 5. In accordance with the invention, the CALL modem and the ANSWER modem use the start-up or initial training sequence to determine and select the initial communication rate based upon the overall quality of the channel as measured separately by both modems. The start-up or initial training comprises two closely linked sequences, namely, a signal sequence for the CALL modem, which is illustrated in the top of FIG. 5, and a signal sequence for the ANSWER modem, which is illustrated in the bottom of FIG. 5. The operation of the CALL modem and the ANSWER modem during this period are as follows.

For purposes of the following discussion, it is assumed that the CALL modem and the ANSWER modem are of the type shown in FIG. 1. Therefore, the specific subsystems within each modem are identified by referring to the corresponding subsystems in FIG. 1. However, to clearly distinguish between the CALL modem and the ANSWER modem when referring to the subsystems, a suffix of "a" or "b" will be appended to the identification numbers depending upon whether the reference is to the CALL modem or the ANSWER modem, respectively.

Initially, the CALL modem establishes contact with the ANSWER modem and awaits a response indicating contact has been made. The ANSWER modem acknowledges the contact by connecting to the channel 8 and sending an ANS tone 60 while at the same time conditioning its scrambler 4$b$ and descrambler 30$b$. The CALL modem responds to the ANS tone 60 by also conditioning its scrambler 4$a$ and descrambler 30$a$.

After the connection has been established, both modems send predetermined sequences of signal states to each other to further condition their receivers. The CALL modem transmits a sequence of signal states designated in FIG. 5 as AA followed by CC. In the meantime, the ANSWER modem sends a different sequence of signal states designated as AC, CA and AC. Both signal sequences contain signal phase reversals which are used by the corresponding receiving modem to determine the round trip delays, NT and MT, for the channel 8. At the conclusion of these sequences of signal states, both modems cease transmission.

In the next phase which is designated as segment 1 in FIG. 5, a period of half-duplex training begins. During this phase, the CALL modem is silent while the ANSWER modem transmits preselected signal sequences. The ANSWER modem sends a training sequence 64 which is an uncoded 4800 bit/sec scrambled signal which the CALL modem uses to train its receiver 16$a$ and which the ANSWER modem uses to train its echo canceller 12$b$.

After the CALL modem has trained its receiver 16$a$ for a suitable amount of time, it uses the remainder of the training sequence 64 in segment 1 to measure the quality of the channel during half-duplex operation. In other words, the CALL modem measures the idle noise and the signal induced distortion with no echo present. By the end of segment 1, the initial rate logic 42$a$ in the CALL modem will have computed and stored the quantity $N_{HD}HD$ described earlier. The duration of the training sequence 64 may be selected so that there is sufficient time for the CALL modem to both train its receiver and compute the channel distortion. Moreover, by extending the duration of the training sequence 64, the CALL modem can increase the number of received signal points used to compute N.HD, thereby improving accuracy.

At the conclusion of the training sequence 64, the ANSWER modem transmits a rate signal $R_1$, which indicates the data rates, coding, and any special operational modes available in the ANSWER modem and its associated DTE. When the CALL modem receives the $R_1$, it freezes its adaptive elements and sends a signal sequence designated as an S signal for a period of time equal to the round trip delay, NT, of the channel 8. Upon detecting the S signal, the ANSWER modem ceases transmission of $R_1$.

The modems now enter Segment 2, which is another period of half-duplex training. During Segment 2, the CALL modem transmits another training sequence 66 to the ANSWER modem while the ANSWER modem remains silent. The CALL modem uses the training sequence 66 to train its echo canceller 12$a$ while the ANSWER modem uses the training sequence 66 to train its receiver 16$b$. After the echo cancellor 12$a$ is trained, the initial rate logic 42$a$ in the CALL modem uses the remainder of the training sequence 66 to determine the noise in the received signal, which includes residual echo as well as idle noise from the channel. By the end of Segment 2, the initial rate logic will have computed and stored SQRERR$_{echo}$. Then, using the two noise measurements, each obtained from a corresponding period of half-duplex training, the initial rate logic 42$a$ determines a rate code for the channel by computing the following formula: QUAN{SQRERR$_{echo}$+$\beta$*N.HD}. The rate code is passed to the rate decision logic 46$a$ which selects the communication rate that the CALL modem can sustain over the channel. The CALL modem sets the DESIRED RATE variable to equal the selected rate and sends the desired rate to the ANSWER modem as a rate signal $R_2$.

When the ANSWER modem receives the rate signal $R_2$, the start-up sequence enters Segment 3, which is a period of full-duplex communication. Throughout Segment 3, the CALL modem continues to send the rate signal $R_2$, while the ANSWER modem transmits a training signal 68. The ANSWER modem uses this period to determine the combined impairment to the channel and to compute the communication rate which it can sustain over the channel. That is, the initial rate logic 42$b$ determines SQRERR$_{combined}$ and then computes a rate code using the following formula: QUAN{SQRERR$_{combined}$}The rate code is passed to the rate decision logic 46$b$ which selects the communication rate which the ANSWER modem can sustain. The ANSWER modem then selects the lower of the communication rate it has computed and $R_2$ and sends this selected rate to the CALL modem as a rate signal $R_3$, which represents the rate at which the two modems will begin data communicate with each other.

One advantage of the invention is particularly highlighted by the above description of modem operation during the start-up sequence. Because the CALL modem is able to compute the combined impairment to the channel by combining the separately determined residual echo and channel distortion, the CALL modem and the ANSWER modem are able to arrive at the optimum communication rate for the channel during the start-up procedure defined by the V.32 specification. Thus, the modems do not experience degraded performance either in the form of a low data transfer rate, if the initial data rate is lower than the optimum rate for the channel, or in the form of a high bit error rate, if the initial rate is higher than the optimum rate.

The modem also includes two registers which store mode information, namely a CURRENT_MODE register 52 and a PAST_MODE register 54, which are shown in FIG. 2. Mode, which refers to whether the modulation used in transmitting the signal is coded or uncoded, is specified during the training sequence in which a particular communication rate is requested or selected. The modem uses the PAST_MODE register 54 and the CURRENT_MODE register 52 to select the proper criteria for determining when to authorize or to request a fall forward in the communication rate when a change in mode is involved This is particularly important because uncoded transmission requires better channel quality at a given communication rate than does coded transmission. Consequently, the criteria used for determining when a fall forward to an uncoded transmission is desirable are not appropriate for determining when a fall forward to a coded transmission is desirable.

To make the proper selection, the modem operates as follows. The modem uses the PAST_MODE register 54 to store the mode specified in the previous received training signal and it uses the CURRENT_MODE register 52 to store the mode specified in the current training sequence. After a training sequence has occurred, the PAST_MODE register 54 identifies the previous mode and the CURRENT_MODE register 52 identifies the mode specified in the most recent training sequence. A comparator 82 in the modem compares the contents of both registers 52 and 54. If the contents of the two registers are different, indicating that a change in mode is being requested, re-initializing logic 84 within the modem resets the FF_ESTIMATE register 48 to zero and modifies the parameters in the 4-phase decision logic 26 which define the size of the inner square that is used to detect when a fall forward from the 4800 bit/sec rate is desirable. On the other hand, if the contents of the CURRENT_MODE register 52 and the PAST_MODE register 54 are the same, indicating that no mode change is being requested, then the modem leaves the contents of the FF_ESTIMATE register 48 undisturbed and does not modify any parameters of the 4-phase decision logic 26.

The modem also uses the PAST_MODE register 54 and the CURRENT_MODE register 52 during the initial training to determine the appropriate parameters used to select the initial communication rate. They are used in the same way as described above.

The modem is implemented by a multiple processor architecture, as shown in FIG. 6. That is, it has a general host processor 86, which performs overall control and data movement functions; a signal processing element 88, which performs the functions of the transmitter 6, the echo-canceller 12 and the combiner 14; and another signal processing element 92, which performs the functions of the receiver 16. A receiver of generally this type is described in U.S. Pat. application Ser. No. 586,681 entitled Processor Interface Circuitry, to Qureshi et al. filed Mar. 6, 1984, incorporated herein by reference.

Other embodiments are within the following claims. For example, the local and remote devices could operate asymmetrically, i.e. using different communication rates in different directions. In such an embodiment, the local device could determine its preferred rate of reception and instruct the remote device to implement that rate, regardless of the remote device's preferred rate of reception and regardless of whether the new rate is higher or lower than the rate at which the local device is transmitting to the remote device. Likewise, the remote device could determine its preferred rate of reception and instruct the local device to implement that rate as the local device's transmission rate regardless of whether the local device concurs that the new rate is its preferred rate of reception.

What is claimed is:

1. An echo cancellation modem for receiving data signals from a remote device over a channel in accordance with one of several possible modulation schemes suitable for different channel qualities, respectively, while simultaneously sending data signals to the remote device over the same channel, said modem comprising
    an echo canceller for reducing echo components appearing in the received channel signal to produce an echo reduced received channel signal having a residual echo component,
    a monitor for determining the quality of the channel based on an analysis of the residual echo component, and
    a controller for selecting an acceptable one of said modulation schemes based on the analysis of said monitor.

2. The modem of claim 1 further comprising circuitry for equalizing and demodulating the echo reduced signal and wherein
    said monitor analyzes the residual echo component based on the equalized and demodulated echo reduced signal.

3. The modem of claim further comprising control circuitry for causing said monitor to analyze said residual echo component while said modem is transmitting a signal and said remote device is not sending a signal.

4. The modem of claim 1 wherein said monitor further determines the quality of the channel based on a separate analysis of the channel distortion imparted when the modem is receiving a signal and is not sending a signal.

5. The modem of claim 4 wherein said monitor determines the quality of the channel based on a combination of the separate analyses of the channel distortion and the residual echo component.

6. The modem of claim 5 wherein said monitor determines the quality of the channel based on a linear combination of said separate analyses of the channel distortion and the residual echo component.

7. The modem of claim 1 wherein said controller includes means for requesting the remote device to shift to a higher level modulation scheme and means for shifting to the higher level modulation scheme if the remote device concurs.

8. The modem of claim 1 wherein said controller includes means for requesting the remote device to shift to a lower level modulation scheme and means for the modem to unilaterally shift to the lower level modulation scheme for transmission of data signals to the remote device.

9. The modem of claim 1 wherein said modulation schemes include different modulation rates.

10. The modem of claim 1 wherein said modulation schemes include coded and uncoded modulation modes.

11. The modem of claim 1 wherein said controller further comprises means for causing said modem to transmit data signals using the same modulation scheme as the remote device uses for its transmissions.

12. A method for use in a modem of the kind which receives data signals from a remote device over a channel in accordance with one of a range of available modulation schemes suitable, respectively, for a range a different channel qualities, a higher level modulation scheme being suitable for a higher channel quality, said method comprising determining whether the channel quality would support a higher level modulation scheme than the modulation scheme being used over the channel, if so, sending a request to the remote device to use a desired higher level modulation scheme, and conditioning the modem not to send a subsequent request for a higher level modulation scheme if a higher level modulation scheme cannot be supported by the remote device.

13. The method of claim 12 wherein said conditioning is based upon the modulation scheme chosen by the other device in response to the request to use a desired higher level modulation scheme sent from the modem.

14. The method of claim 12 wherein the conditioning step comprises if the remote device concurs in the use of the desired modulation scheme and if there remains a higher level modulation scheme usable by the modem, then conditioning the modem to send the subsequent request to use a higher level modulation scheme if the channel quality improves, and if the remote device does not concur in the use of the desired modulation scheme or if there is no higher modulation scheme usable by the modem, then conditioning the modem to refrain from sending the subsequent request to use a higher level modulation scheme even if the channel quality improves.

15. A method for use in a modem of the kind which receives data signals from a remote device over a channel in accordance with one of a range of available modulation schemes which are suitable, respectively, for different levels of channel quality, a higher level modulation scheme being suitable for a higher channel quality, said modulation schemes including coded and uncoded modulation modes, comprising initializing said modem using a threshold having a selected one of two values, one value corresponding to a change to a coded modulation mode and a different value corresponding to a change to an uncoded modulation mode, monitoring the quality of the channel based on received data signals, determining when a change to a higher level modulation scheme would be permissible based on when the monitored channel quality exceeds the threshold, requesting the remote device to change to a higher level modulation scheme employing the modulation mode corresponding to the selected value when a change to the higher level modulation scheme is determined to be permissible, and reinitializing said modem so as to set the threshold to the other value in response to an indication from the remote device that the requested modulation mode is not available.

16. A method for use in echo cancellation modem of the kind which communicates in full-duplex with a remote device over a channel in accordance with one of a range of available modulation schemes suitable, respectively, for different levels of channel quality, a higher level modulation scheme being suitable for a higher channel quality, wherein different modulation schemes which operate at the same communication rate may use different signal point constellations and wherein the quality of the channel is determined in part by the presence of an echo, the method comprising:

reducing echo components appearing in a received channel signal while leaving a residual echo component in the echo reduced channel signal, monitoring the quality of the channel based on an analysis of the residual echo component, and selecting a signal point constellation based on the monitored channel quality.

17. The method of claim 16 wherein one said signal point constellation comprises more than $2^N$ points, where N is the number of bits per signaling interval to be sent.

18. A method of setting an initial reception rate for an echo cancellation modem of the kind which receives data signals from a remote device over a channel at one of several possible rates and which is subject to an initial training procedure prior to initial reception of data signals, comprising reducing echo components appearing in a received channel signal while leaving a residual echo component in the echo reduced channel signal, monitoring the quality of the channel during the initial training procedure, wherein the quality of the channel is determined based on the analysis of the residual echo component, and immediately setting the initial rate to a value corresponding to the rate sustainable on the channel based on its monitored quality.

19. The method of claim 18 further comprising analyzing said residual echo component while said modem is transmitting a signal and said remote device is not sending a signal.

20. The method of claim 18 wherein the quality of the channel is further determined based on a separate analysis of the channel distortion imparted when the modem is receiving a signal and is not sending a signal.

21. The method of claim 20 wherein the quality of the channel is determined based on a combination of the separate analyses of the channel distortion and the residual echo component.

22. A modem which receives data signals from a remote device over a channel in accordance with one of a range of available modulation schemes suitable, respectively, for a range of different channel qualities, a higher level modulation scheme being suitable for a higher channel quality, said modem comprising:

quality monitoring logic for monitoring the quality of the channel, a fall forward flag register for storing a fall forward flag, conditioning logic for conditioning the fall forward flag to indicate whether an opportunity exists for the modulation scheme to fall forward to a higher modulation scheme, rate adjustment logic responsive to the quality monitoring logic for determining that the channel will support a fall forward to a higher level modulation scheme, rate setting logic responsive to the rate adjustment logic for sending a subsequent fall forward request to the remote device wherein the rate setting logic sends the subsequent fall forward request only if the fall forward flag is conditioned to indicate that an opportunity to fall forward exits.

23. The modem as defined in claim 22 wherein the conditioning logic conditions the fall forward flag based upon the modulation scheme chosen by the remote device in response to an earlier request to fall forward sent by the modem, said earlier fall forward request preceding said subsequent fall forward request.

24. The modem as defined in claim 22 wherein a current modulation scheme is selected in response to an earlier request by the modem to use a desired modulation scheme, said earlier modulation scheme request preceding the selection of said current modulation scheme, and wherein the conditioning means conditions the flag in accordance with the following rule:

If the highest modulation scheme available to the modems is higher than the current modulation scheme, And if the desired modulation scheme is equal to the current modulation scheme, Then the conditioning logic conditions the flag to indicate that an opportunity to fall forward to a higher modulation scheme exists, otherwise the conditioning logic conditions the flag to indicate that a fall forward to a higher modulation scheme does not exist.

25. A modem which receives data signals from a remote device over a channel in accordance with one of a range of available modulation schemes which are suitable, respectively, for different levels of channel quality, a higher level modulation scheme being suitable for a higher channel quality, said modulation schemes including coded and uncoded modulation modes, the modem comprising:

initialization logic for initializing said modem using a threshold having a selected one of two values, one value corresponding to a change to a coded modulation mode and a different value corresponding to a change to an uncoded modulation mode, quality monitoring logic for monitoring the quality of the channel based on received data signals, fall forward logic for determining when a change to a higher level modulation scheme would be permissible based on when the monitored channel quality exceeds the threshold, request logic for requesting the remote device to change to a higher level modulation scheme employing the modulation mode corresponding to the selected one of two values when a change to the higher level modulation scheme is determined to be permissible, reinitialization logic for causing a reinitialization of said modem so as to set the threshold to the other value in response to an indication from the remote device that the requested modulation mode is not available.

* * * * *